(12) United States Patent
Downen et al.

(10) Patent No.: US 8,011,008 B2
(45) Date of Patent: Aug. 30, 2011

(54) APPLICATION SECURITY MODEL

(75) Inventors: Michael D. Downen, Sammamish, WA (US); Raja Krishnaswamy, Redmond, WA (US); Arun Moorthy, Newcastle, WA (US); Charles W. Kaufman, Sammamish, WA (US)

(73) Assignee: Microsoft Corporation, Remond, WA (US)

( * ) Notice: Subject to any disclaimer, the term of this patent is extended or adjusted under 35 U.S.C. 154(b) by 958 days.

(21) Appl. No.: 11/939,383

(22) Filed: Nov. 13, 2007

(65) Prior Publication Data
US 2009/0126011 A1   May 14, 2009

(51) Int. Cl.
*G06F 17/30* (2006.01)
(52) U.S. Cl. .................................. 726/21; 726/3; 726/4
(58) Field of Classification Search .................... 726/21, 726/3, 4
See application file for complete search history.

(56) References Cited

U.S. PATENT DOCUMENTS

| | | | |
|---|---|---|---|
| 7,039,801 B2 | 5/2006 | Narin | |
| 7,082,600 B1 | 7/2006 | Rau et al. | |
| 7,168,063 B2 | 1/2007 | Meijer | |
| 2004/0019887 A1 | 1/2004 | Taylor et al. | |
| 2004/0133777 A1 | 7/2004 | Kiriansky et al. | |
| 2004/0143631 A1 | 7/2004 | Banerjee et al. | |
| 2005/0172133 A1 | 8/2005 | Brumme et al. | |
| 2005/0172286 A1 | 8/2005 | Brumme et al. | |
| 2006/0075383 A1 | 4/2006 | Moorthy et al. | |
| 2006/0129995 A1 | 6/2006 | DeBoe et al. | |
| 2006/0259763 A1 | 11/2006 | Cooperstein et al. | |
| 2007/0199050 A1 | 8/2007 | Meier | |
| 2007/0199051 A1 | 8/2007 | Parikh et al. | |

OTHER PUBLICATIONS

Mike Downen, What's New with Code Access Security in the .NET Framework 2.0, Nov. 2005.*
CSTS: A Prototype Tool for Testing COM Component Security; Jinfu Chen; Yansheng Lu; Xiaodong Xie; Hybrid Intelligent Systems, 2009. HIS '09. Ninth International Conference on vol. 3; Publication Year: 2009 , pp. 83-88.*
Can Microsoft's Service Pack2 (SP2) Security Software Prevent SMURF Attacks?; Kumar, S.; Azad, M.; Gomez, O.; Valdez, R.; Telecommunications, 2006. AICT-ICIW '06. International Conference on Internet and Web Applications and Services/Advanced International Conference on; Publication Year: 2006; p. 89-94.*
From stack inspection to access control: a security analysis for libraries; Besson, F.; Blanc, T.; Fournet, C.; Gordon, A.D.; Computer Security Foundations Workshop, 2004. Proceedings. 17th IEEE; Publication Year: 2004 , pp. 61-75.*

(Continued)

Primary Examiner — David Y Jung
(74) Attorney, Agent, or Firm — Workman Nydegger (57) ABSTRACT

Performing security sensitive operations with an application security model. Security agnostic code is executed. The security agnostic code is identified as not having authorization to perform a security sensitive operation. Executing the security agnostic code includes calling code identified as security safe critical code. In response to the security agnostic code calling the security safe critical code, the security safe critical code is executed. The security safe critical code includes functionality for performing validity checks. Executing the security safe critical code includes performing an validity check for the security agnostic code. When the security agnostic code passes the validity check, code identified as security critical code is called. In response to the security safe critical code calling the security critical code, the security critical code is executed. The security critical code is authorized to perform the security sensitive operation.

20 Claims, 3 Drawing Sheets

OTHER PUBLICATIONS

.NET Security Blog, "The Silverlight Security Model", 2007, 4 pages, http://blogs.msdn.com/shawnfa/archive/2007/05/09/the-silverlight-security-model.aspx.
Allen, Jonathan, "Silverlight's New Security Model", May 2, 2007, 2 pages, http://www.infoq.com/news/2007/05/Silverlight-SecurityModel.
Pramati Server 3.5, 2003, 4 pages, http://www.pramati.com/docstore/1215012/psv35data.pdf.
"Container internationalization attributes", 2 pages, Jun. 2007, http://publib.boulder.ibm.com/infocenter/wasinfo/v6r0/index.jsp?topic=/com.ibm.websphere.express.doc/info/exp/i18n/concepts/cin_containerattribute.html.

* cited by examiner

APPLICATION SECURITY MODEL

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Through the available interconnections computer systems can access computer code from a number of different locations. For example, computer systems will often download computer code from Internet web pages so that advanced functionality can be implemented to provide a rich user experience. However, just as useful computer code can be accessed through the interconnections, so to can malicious code be accessed through the interconnections. This malicious code may compromise the security of the computer system, allow for theft of personal and/or financial information, conscript the computer system for use in denial of service attacks or propagation of spam e-mail, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrate herein comprises a method practiced in a computing environment. The method comprises acts for performing security sensitive operations. The method includes executing security agnostic code. The security agnostic code is identified as not having authorization to perform a security sensitive operation. Executing the security agnostic code includes calling code identified as security safe critical code. In response to the security agnostic code calling the security safe critical code, the security safe critical code is executed. The security safe critical code includes functionality for performing validity checks. Executing the security safe critical code includes performing a validity check for the security agnostic code. When the security agnostic code passes the validity check, code identified as security critical code is called. In response to the security safe critical code calling the security critical code, the security critical code is executed. The security critical code is authorized to perform the security sensitive operation.

In another embodiment, a method of validating code is illustrated. The method includes accessing code. The code includes security agnostic code, where the security agnostic code is identified as not having authorization to perform a security sensitive operation, security safe critical code, where the security safe critical code includes functionality for performing validity checks, and security critical code. The security critical code is authorized to perform the security sensitive operation. The security safe critical code is used to link the security critical code to the security agnostic code. Security agnostic code is less privileged than security safe critical code or security critical code. The method includes determining checking the validity of type inheritance hierarchies. The method may further include determining whether or not methods have changed accessibility from a base method from which they inherit. Further, a determination is made as to whether a base class has a default constructor. If the base class has a privileged default constructor, then a determination is made as to whether the default constructor of the derived class follows certain privilege rules. An indication is provided when types in the code are more privileged than a base type from which they inherit, methods have changed accessibility from a base method from which they inherit; or a derived class is more privileged than the default constructor of the base class.

In another embodiment, a method of validating code is illustrated. The method includes identifying security agnostic code. The security agnostic code is identified as not having authorization to perform a security sensitive operation. Security critical code is identified. The security safe critical code comprises functionality for performing validity checks. The method also includes determining that the security agnostic code is not linked to the security critical code except through security safe critical code. The security critical code is authorized to perform the security sensitive operation. An error is triggered if the security agnostic code is not linked to the security critical code through the security safe critical code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Embodiments described herein implement code security by layering code. For example, three kinds of code may exist including security agnostic code where the security agnostic code is identified as not having authorization to perform a security sensitive operation, security safe critical code, where the security safe critical code includes functionality for performing validity checks, and security critical code, where the security critical code is authorized to perform the security sensitive operation. The security agnostic code is often untrusted code about which little may be known in terms of security. Privileges of security agnostic code can be controlled by transitioning from the security agnostic code to the security critical code through security safe critical code.

In some embodiments, ensuring that privileges are appropriately controlled can be accomplished by static check of code. For example, code may be marked through an attribute or may be designated through language keywords as security agnostic, security safe critical, or security critical. Further, the code may be required to comply with certain inheritance rules. As such, a static check can be performed to ensure that code of a kind follows the inheritance rules.

In some embodiments, a primary unit of isolation is the application domain. Application domains may be sandboxed when no application domains are treated as fully trusted. A sandbox is a set of rules that are used that prevent certain functions when an application is executed in a framework. The sandbox creates an environment in which there are limitations on what system resources the application can access. Sandboxes are used when executable code comes from unknown or un-trusted sources and allow the user to run un-trusted code safely.

In some embodiments, there is no managed cross-application domain remoting support. In other words, there is no support for managed code to create new application domains or transition into another application domain. All application domain transitions happen in native code and are under host control. In this example, the host is fully-trusted in all cases.

An interoperability boundary may be implemented. Platform code can exist on either side of the interoperability boundary, while application code is not allowed to exist on both sides of the interoperability boundary. Boundary enforcement may be added to a framework to ensure these conditions. Illustratively, delegates are created or marshaled targeting managed platform code. Further, platform invokes out to native code are performed from within platform code. Security enforcements are scoped to an application domain. In some embodiments, there is no need for a check that spans across application domains.

As alluded to above, embodiments may be implemented where assemblies are classified into two categories, platform assemblies and application assemblies. Application assemblies are un-trusted assemblies, containing application code authored by external application developers which may be external to a security enforcement framework. For example, an application may be any managed code written by someone developing a website using a web page design tool. While some traditional application assemblies can be fully-trusted, such as for example an application installed on a local computer, some application assemblies in the present example, are not considered fully-trusted.

Platform assemblies are framework assemblies exposing key functionality to application assemblies. These assemblies are considered trusted assemblies and parts of them may access functionality not available in the application domain to the application. Embodiments may be implemented such that to implement a platform assembly, two requirements should be satisfied: (1) the assembly is strongname-signed with a known key and (2) the assembly is located in a known trusted location.

When application domains are created, a trusted path can be specified and files located on that path are considered to be in a trusted location.

Figure 1A:
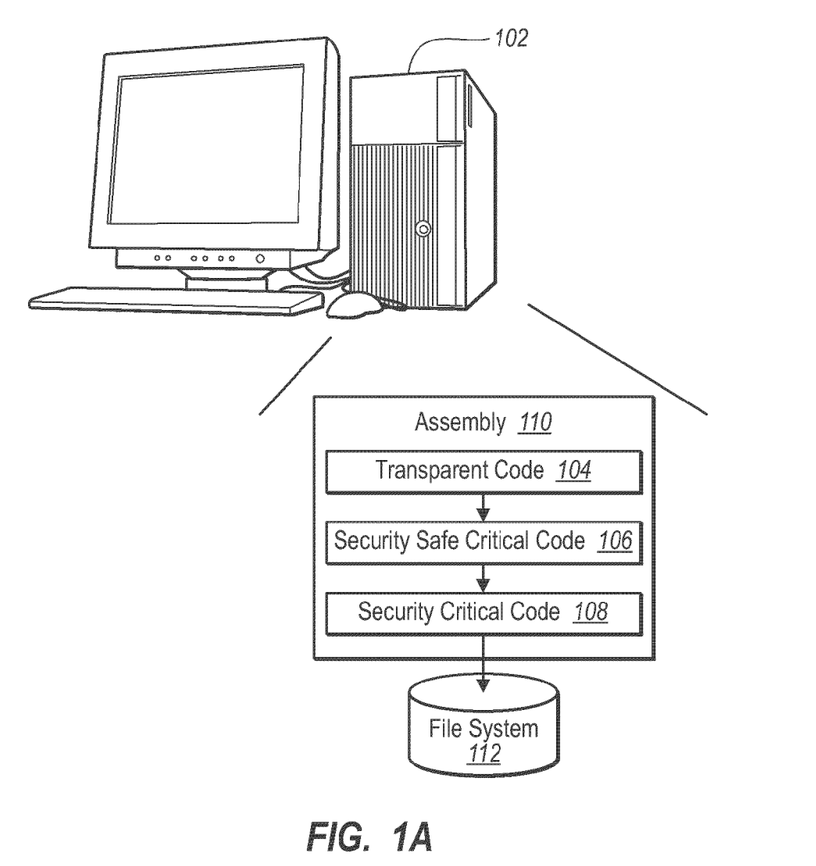
FIG. 1A illustrates an assembly in a computer system.

Referring now to FIG. 1A, managed code may be implemented on a computing system 102. In the particular embodiment illustrated, managed code is classified into three categories: security transparent code 104, security critical code 106, and security safe critical code 108. Security transparent code 104 is code that is security agnostic. It is code that executes with the least privilege and no security elevation. This category of code is not authorized to perform operations classified as security sensitive with respect to the security transparent code 104. For example, security transparent code 104 cannot use platform invokes or unverifiable code. All application code is considered security transparent code 104. Platform code that exists in the context of the application or platform code that does not need to perform any security elevation may also be security transparent code 104.

Security transparent code 104 typically does not require any audit or security review. In some embodiments, it may be desirable to have as little code that is not security transparent in the assembly 110 as possible. In some embodiments, an entire assembly 110 may be security transparent if it does not need to perform any privileged operations. Additionally, some embodiments may be implemented where code is security transparent 104 by default.

Security critical code 108 is code that performs some security-sensitive operation or code that logically steps outside a security sandbox established in the application domain. As noted previously, platform invokes and unverifiable code are examples security critical code. Illustratively, when a platform invoke out to native code is performed, the managed domain and the application domain sandbox are exited. When using unverifiable code, there is an abandonment of the security afforded by a core runtime engine type safety system. In some embodiments, the core runtime engine enforces limitations such that such operations are permitted only in security critical code. Other embodiments may allow for security critical code or security safe critical code to perform such operations. In the example illustrate in FIG. 1A, the security critical code is authorized to perform operations on the file system 112. File systems are an example of a computing system that may need to be protected from un-trusted code. Many other examples exist, and may be system specific.

Security safe critical code should be subjected to a thorough security audit and review. In some embodiments, it may be desirable to minimize the amount of security safe critical code in an assembly. By requiring intensive security audits of security safe critical code, the most likely mistakes in programming which may expose security risks are forced into a small amount of security safe critical code.

In some embodiments, an attribute can be used to mark sections of code that are security critical. Notably, other methods may also be used to identify code as security critical. For example, a programming language may include keywords that allow code to be identified as security critical. Other methods of identifying the code may also be implemented.

In some embodiments, the core runtime engine enforces restrictions that security transparent code cannot directly access security critical code and data. Instead, security safe critical code 106 acts as a bridge or gateway between security transparent 104 and security critical code 108. The security safe critical layer 106 performs validity checks, which may include authorization checks, input validation or any other measures that may be needed before allowing access to the functionality in security critical code 108. As noted, security safe critical code may perform authorization checks to determine that some piece of managed code is authorized to make a particular call to security critical code. Further, security safe critical code may have additional responsibility for checking that arguments are consistent and well formed. For example, if a user were to implement a "copy block of bits" function in managed code, it may be the security safe critical code's responsibility to make sure that the requested length is no greater than the length of either the input or output buffers. The security safe critical code could then call security critical code with the same arguments and have the security critical code do a bit move without a bounds checks. Thus, a validity check may include one or more of authorization checks, well-formedness checks, or other appropriate checks.

Illustrating now an example, application code, which is security transparent code 104, may not have access to a file system 112 directly. In the particular example, file system application programming interfaces (APIs), may be marked as security critical code 108. A platform can choose to provide a restricted storage facility for application code. Some of the code that implements isolated storage for the restricted storage facility may be marked security safe critical 106 to allow application code to access those APIs and internally those APIs will perform validation, such as input or quota validations. Those APIs will then invoke security critical file APIs.

Security safe critical code 106 is subjected to thorough security audit and review procedures. It may be desirable in some embodiments to minimize the amount of security safe critical code 106 in an assembly. The security safe critical code may include an attribute that can be used to mark sections of code that are security safe critical.

In some embodiments a security safe critical layer may be implemented due to the nature of the implementation where no input or security checks are necessary in the security safe critical layer. For example, code that determines a string length may be implemented internally using a call to native code. However, code that determines string length may also be safe to call from application code.

Figure 1B:
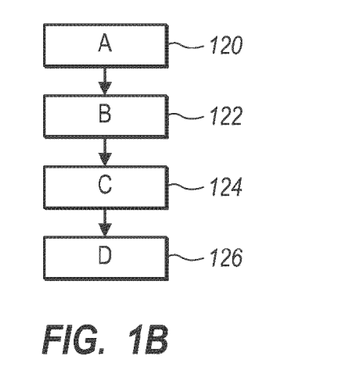
FIG. 1B illustrates a chain of code calls.

In some embodiments, security safe critical code can be used on non-public members to limit the amount of critical code in an assembly. Consider the call sequence illustrated in FIG. 1B. In FIG. 1B, code A 120 calls code B 122, code B 122 calls code C 124, and code C 124 calls code D 126.

If code D 126 needs to platform invoke, but that platform invoke is safe to do regardless of the callers above, then code D 126 can be marked security safe critical. That would allow code A 120, code B 122 and code C 124 to all be transparent.

A core runtime engine can prevent security transparent code from directly accessing security critical code and data. All other actions across categories may be allowed. For example, security critical code can access security transparent or security safe critical code and data. Security safe critical code can access security transparent or security critical code and data. Security critical code in a lower layer may be wrapped and exposed to application code in a higher layer.

In some embodiments, there is no enforcement to prevent security critical at and security safe critical attributes from being used in application code. In particular, embodiments may be implemented where these attributes are public and can be used as appropriate in application code.

Embodiments may require compliance with specific requirements with regard to security annotations on an inheritance hierarchy. In particular, transparent security agnostic code is less privileged than either of security safe critical code or security critical code in terms actions allowed by the code. For purposes of the following discussion, it may be helpful to assign an order to "transparent", "critical" and "safe critical" code based on access and capabilities. That order may be: transparent<safe critical<critical. Going from left to right, access gets more restrictive. In particular, transparent and safe critical code have no restrictions on access, but critical code enforces that access is restricted to critical or safe critical code. As it relates to privileges, going from left to right, capabilities increase. Illustratively, transparent code has a limited set of capabilities or allowed actions including not being able to call unverifiable code, no platform invoke privileges, no privileges to access critical code etc. Safe critical and critical code may have no restrictions.

Some rules that may be implemented are as follows: Derived types should be at least as restrictive as the base type. Derived methods should not change accessibility from the base method. If the base class has a default constructor, the default constructor of the derived class should be at least as restrictive as the base default constructor.

Notably, for the rule specifying that derived methods should not change accessibility from the base method, accessibility may define whether or not application code can invoke that method. Application code can access both security transparent members and security safe critical members, but cannot access security critical members. Thus, in terms of accessibility to application code, transparent and security safe critical code may have the same accessibility while security critical code has different accessibility. The rule specifying that derived methods should not change accessibility from the base method specifies that movement between these two accessibilities is prevented while going down an inheritance hierarchy.

The following tables illustrate inheritance rules that may be implemented in one example embodiment. Table 1 illustrates type inheritance patterns that may be allowed.

TABLE 1

| Allowed Type Inheritance Patterns | |
| --- | --- |
| Base Class | Derived Class |
| Transparent | Transparent |
| Transparent | Safe Critical |
| Transparent | Critical |
| SafeCritical | SafeCritical |
| SafeCritical | Critical |
| Critical | Critical |

Table 2 illustrates type inheritance patterns that are disallowed.

TABLE 2

Disallowed Type Inheritance patterns

| Base Class | Derived Class |
|---|---|
| SafeCritical | Transparent |
| Critical | Transparent |
| Critical | SafeCritical |

Table 3 illustrates allowed method inheritance patterns.

TABLE 3

Allowed Method Inheritance Patterns

| Base Method | Override Method |
|---|---|
| Transparent | Transparent |
| Transparent | SafeCritical |
| SafeCritical | Transparent |
| SafeCritical | SafeCritical |
| Critical | Critical |

Table 4 illustrates disallowed inheritance patterns.

TABLE 4

Disallowed Method Inheritance patterns

| Base Method | Override Method |
|---|---|
| Transparent | Critical |
| SafeCritical | Critical |
| Critical | Transparent |
| Critical | SafeCritical |

Notably, the rules and inheritance patterns described above may be used to statically evaluate a package for appropriate security constraints. The static evaluation may be performed at any appropriate time. For example, the static evaluation may be performed at design time, at compile time, just prior to runtime, or at any other appropriate time. In some embodiments, this may be facilitated by the nature in which code is identified as being a particular kind of code. Examples of method of performing security evaluations will be discussed in more detail below.

Figure 2:
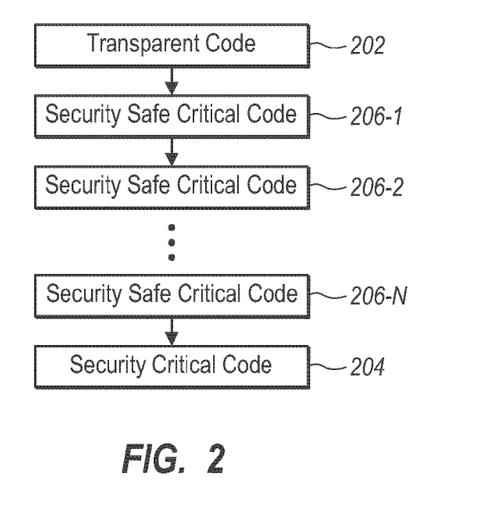
FIG. 2 illustrates layering of assembly code.

Referring now to FIG. 2, another example of code layering is illustrated. The example illustrated in FIG. 2 illustrates how code laying can be used to granularly provide security in an assembly. FIG. 2 illustrates that transparent code 202 is bridged to security critical code 304 through several layers of security safe critical code 206-1 through 206-N. Each of theses layers of security safe critical code can perform appropriate validity checks to control the operations that may be effectuated by calling the transparent code 202, which eventually causes the security critical code 204 to be called. Thus, appropriate security over security sensitive operations can be accomplished by layering appropriate security safe critical code to bridge the transparent code 202 to the security critical code 204.

Embodiments may be implemented where each layer of security safe critical code 306 represent code that may be included in a service providing particular functionality. The service may perform appropriate validity checks to ensure that transparent code accessing the service is safe for the particular operations requested.

Figure 3:
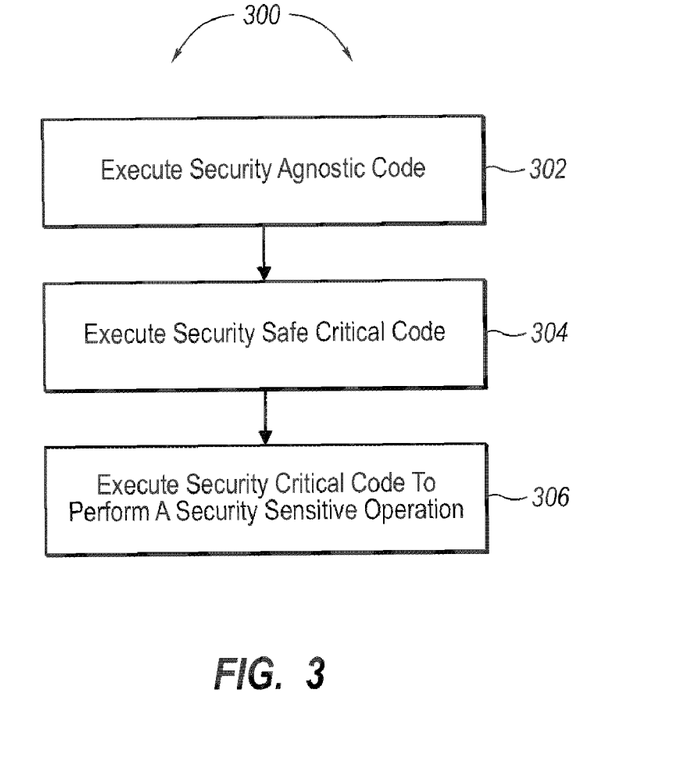
FIG. 3 illustrates a method of performing security sensitive operations.

Referring now to FIG. 3, a method 300 is illustrated. The method 300 includes acts for performing security sensitive operations. The method 300 includes executing security agnostic code in an application (act 302). The security agnostic code is identified as not having authorization to perform a security sensitive operation. For example, as illustrated above, examples may include restricting code from performing certain file system operations, or other security sensitive operations. Executing the security agnostic code includes calling code identified as security safe critical code in the application. In response to the security agnostic code calling the security safe critical code, the security safe critical code is executed (act 304). The security safe critical code includes functionality for performing validity checks. Executing the security safe critical code includes performing an validity check for the security agnostic code. When the security agnostic code passes the validity check, code identified as security critical code is called in the application. In response to the security safe critical code calling the security critical code, the security critical code is executed. The security critical code is authorized to perform the security sensitive operation.

To ensure appropriate security of assemblies using the code described above, certain inheritance rules should be followed. For example, in one embodiment of the method 300, the security agnostic code is derived only from other security agnostic code. In one embodiment, the security safe critical code is derived only from other security safe critical code or security agnostic code. The security safe code may be derived from other security safe code, security safe critical code or security agnostic code.

To ensure that security is maintained verification of an assembly may be performed. For example, in the method 300 embodiments may further include, prior to executing the security agnostic code, identifying the security agnostic code, identifying the security critical code, and determining that the security agnostic code is linked to the security critical code through the security safe critical code. An error is triggered if the security agnostic code is not linked to the security critical code through the security safe critical code.

As noted previously, embodiments may include functionality for identifying code as being of a certain kind. In one embodiment, this may be performed by using attributes. For example, the security agnostic code may include an attribute identifying the security agnostic code as security agnostic code, the security critical code may include an attribute identifying the security critical code as security critical code, and the security safe critical code may include an attribute identifying the security safe critical code as security safe critical code.

Embodiments may be implemented where the security safe critical code may include layers of safety limiting privileges for security agnostic code according to layers for services. For example, as illustrated in FIG. 2, each of the security safe critical layers 206-1 through 206-N may represent functionality provided by a particular service. Layering the security safe critical layers 206 allows for layering of service functionality.

Figure 4:
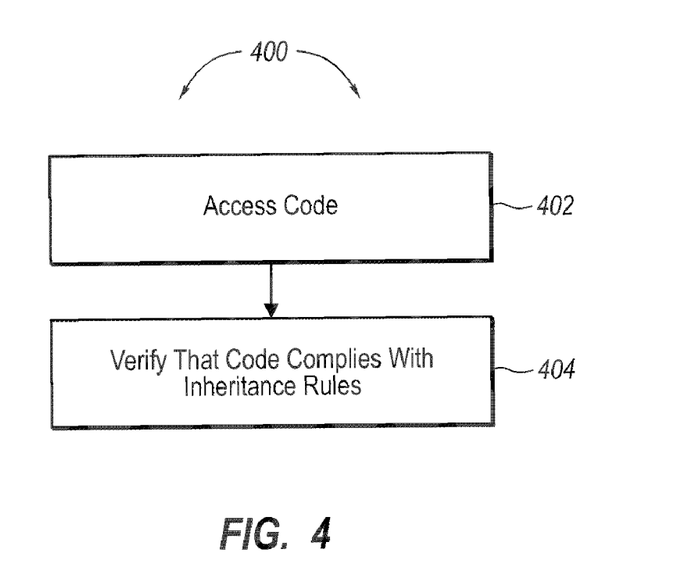
FIG. 4 illustrates a method of verifying that code complies with certain inheritance rules.

Referring now to FIG. 4, a method 400 is illustrated. The method 400 includes acts for validating code. The method 400 includes accessing code (act 402). The code includes security agnostic code, where the security agnostic code is identified as not having authorization to perform a security sensitive operation, security safe critical code, where the security safe critical code includes functionality for performing validity checks, and security critical code, where the security critical code is authorized to perform the security sensitive operation. The security safe critical code is used to link the security critical code to the security agnostic code.

Security agnostic code is less restrictive than security safe critical code, which is less restrictive than security critical code.

The method 400 further includes an act of verifying that the code complies with appropriate inheritance rules (act 404). For example, embodiments may include determining whether or not types in the code are at least as restrictive as a base type from which they inherit. Embodiments may include determining whether or not methods have changed accessibility from a base method from which they inherit. Embodiments may include determining whether a base class has a default constructor, and if the base class has a default constructor, then determining whether a derived class is at least as restrictive as the default constructor of the base class. Embodiments may also appropriate indications when validation checks are passed or failed. For example, embodiments may include providing an indication when types in the code are not at least as restrictive as a base type from which they inherit, methods have changed accessibility from a base method from which they inherit; or a derived class is not at least as restrictive as the default constructor of the base class.

The method 400 may be performed statically prior to a runtime of the application code. In another embodiment, the method 400 may be performed statically at compile time of the code. In yet another embodiment, the method 400 may be performed statically at installation time of the code.

The method 400 may include further acts for determining that code is inherited properly. For example, the method 400 may include determining if the security agnostic code is derived only from other security agnostic code and providing an indication if the security agnostic code is not derived only from other security agnostic code. Similarly, the method 400 may include determining if the security safe critical code is derived only from other security safe critical code or security agnostic code and providing an indication if the security safe critical code is not derived only from other security safe critical code or security agnostic code.

Figure 5:
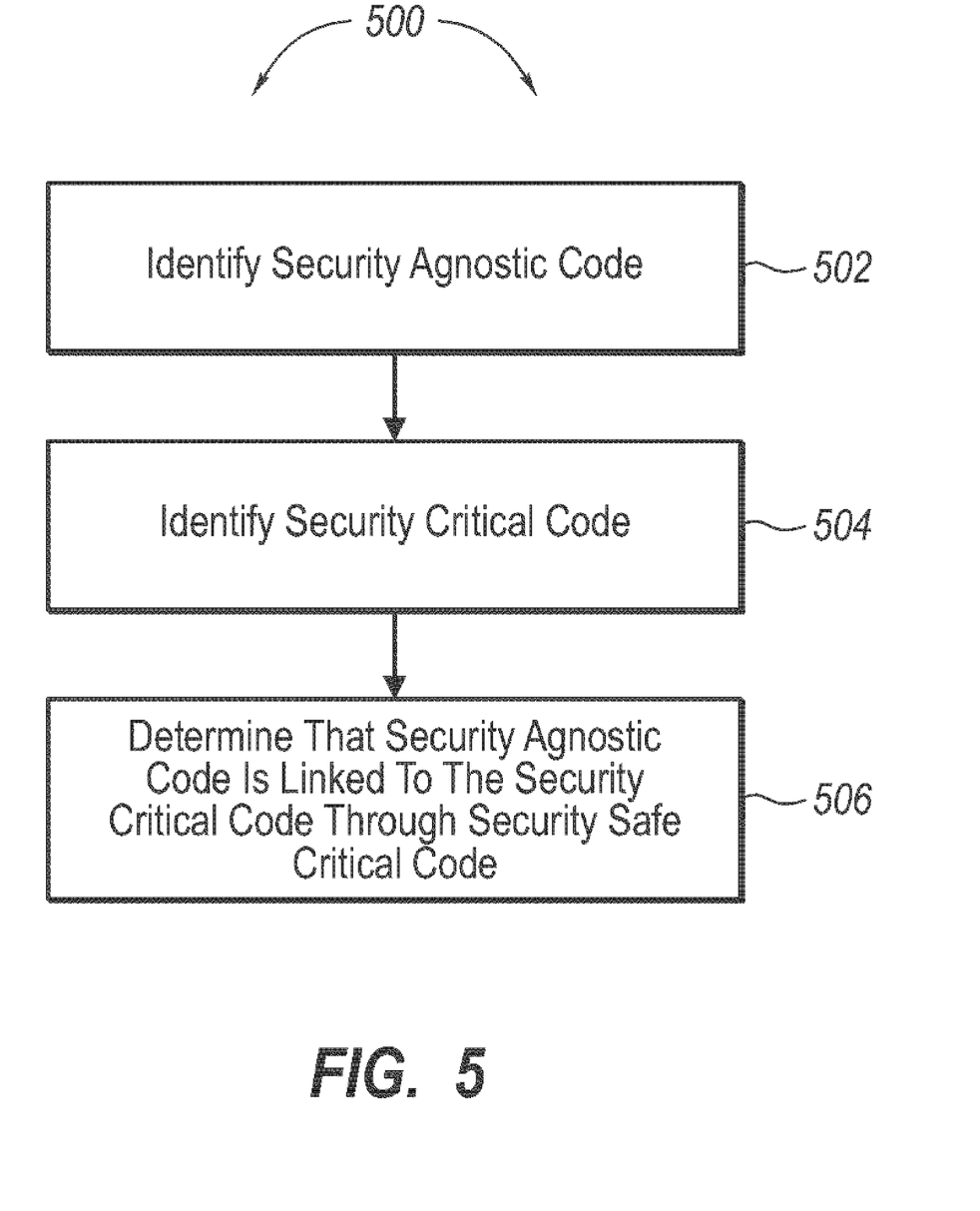
FIG. 5 illustrates a method of analyzing code.

Referring now to FIG. 5, a method 500 of validating code is illustrated. The method includes identifying security agnostic code (act 502). The security agnostic code is identified as not having authorization to perform a security sensitive operation. The method 500 further includes identifying security critical code (act 504). The security critical code is authorized to perform the security sensitive operation. The method 500 further includes determining that the security agnostic code is linked to the security critical code through security safe critical code. The security safe critical code includes functionality for performing validity checks. In method 500, an error is triggered if the security agnostic code is not linked to the security critical code through the security safe critical code.

The method 500 may further include various validations and inheritance checks to determine that code include the appropriate security. For example, the method 500 may include determining whether or not types in the code are at least as restrictive as a base type from which they inherit. The method 500 may further include providing an indication when types in the code are not at least as restrictive as a base type from which they inherit.

A further validation may include determining whether or not methods have changed accessibility from a base method from which they inherit and providing an indication when methods have changed accessibility from a base method from which they inherit.

Yet another validation may include determining if a base class has a default constructor. If the base class has a default constructor, then a determination is made if a derived class is at least as restrictive as the default constructor of the base class. An indication is provided when a derived class is not at least as restrictive as the default constructor of the base class. As alluded to previously, the method 500 may performed statically prior to a runtime of the application code. This may be facilitated, for example, by appropriate attributes used for application code, or keywords used in a programming language for the code. For example, the security agnostic code may include an attribute identifying the security agnostic code as security agnostic code, the security critical code may include an attribute identifying the security critical code as security critical code, and the security safe critical code may include an attribute identifying the security safe critical code as security safe critical code. Alternatively, the security agnostic code is identified as security agnostic code using a keyword, the security critical code is identified as security critical code using a keyword, and the security safe critical is identified as security safe critical code using a keyword.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing security sensitive operations, the method performed by executing computer executable instructions within a computing system, the method comprising:

executing security agnostic code wherein the security agnostic code is identified as not having authorization to perform a security sensitive operation and wherein executing the security agnostic code comprises calling code identified as security safe critical code;

in response to the security agnostic code calling the security safe critical code, executing the security safe critical code, wherein the security safe critical code comprises functionality for performing validity checks, and wherein executing the security safe critical code comprises performing an validity check for the security agnostic code and when the security agnostic code passes the validity check, calling code identified as security critical code;

determining that each of a set of inheritance rules governing types and methods of each of the security agnostic code, the security safe critical code, and the security critical code are correctly followed, the inheritance rules defining a set of allowed and disallowed inheritance patterns for the types and methods of each of the security agnostic code, the security safe critical code, and the security critical code; and in response to the security safe critical code calling the security critical code, executing the security critical code, wherein the security critical code is authorized to perform the security sensitive operation.

2. The method of claim 1, wherein the security agnostic code is derived only from other security agnostic code.

3. The method of claim 1, wherein the security safe critical code is derived only from other security safe critical code or security agnostic code.

4. The method of claim 1, wherein the security critical code is derived from other security critical code, security safe critical code or security agnostic code.

5. The method of claim 1, further comprising, prior to executing the security agnostic code:
identifying the security agnostic code;
identifying the security critical code; and
determining that the security agnostic code is linked to the security critical code only through the security safe critical code, and wherein an error is triggered if the security agnostic code is linked to the security critical code bypassing the security safe critical code.

6. The method of claim 1, wherein the security agnostic code comprises an attribute identifying the security agnostic code as security agnostic code, the security critical code comprises an attribute identifying the security critical code as security critical code, and the security safe critical code comprises an attribute identifying the security safe critical code as security safe critical code.

7. The method of claim 1, wherein the security safe critical code provides a layer of safety limiting privileges for security agnostic code.

8. A method of validating code, the method performed by executing computer executable instructions within a computing system, the method comprising:
accessing code, wherein the code comprises:
security agnostic code, wherein the security agnostic code is identified as not having authorization to perform a security sensitive operation;
security safe critical code, wherein the security safe critical code comprises functionality for performing validity checks, and
security critical code, wherein the security critical code is authorized to perform the security sensitive operation, and wherein the security safe critical code is used to link the security critical code to the security agnostic code, and wherein security agnostic code is less privileged than security safe critical code and security critical code;

determining whether or not types in the code are allowed types within a set of inheritance rules governing types and methods for a base type from which they inherit;
determining whether or not methods have an allowed accessibility within a set of inheritance rules governing types and methods from a base method from which they inherit;
determining whether a base class has an access-restricted default constructor;
when the base class has an access-restricted default constructor, then determining if the default constructor a derived class is at least as access-restricted as the default constructor of the base class; and
providing an indication when types in the code are not at least as access-restricted as a base type from which they inherit, methods have changed accessibility from a base method from which they inherit; or the default constructor in a derived class is not at least as access-restricted as the default constructor of the base class.

9. The method of claim 8, wherein the method is performed statically prior to a runtime of the code.

10. The method of claim 8, wherein the method is performed statically at compile time of the code.

11. The method of claim 8, wherein the method is performed statically at installation time of the code.

12. The method of claim 8, determining if the security agnostic code is derived only from other security agnostic code and providing an indication if the security agnostic code is not derived only from other security agnostic code.

13. The method of claim 8, determining if the security safe critical code is derived only from other security safe critical code or security agnostic code and providing an indication if the security safe critical code is not derived only from other security safe critical code or security agnostic code.

14. A method of validating code, the method performed by executing computer executable instructions within a computing system, the method comprising:
identifying security agnostic code, wherein the security agnostic code is identified as not having authorization to perform a security sensitive operation;
identifying security critical code wherein the security critical code is authorized to perform the security sensitive operation
identifying security safe critical code wherein the security safe critical code comprises functionality for performing validity checks;
determining whether or not the security agnostic code is linked to the security critical code through the security safe critical code;
allowing the security safe critical code to perform the security sensitive operation when the security agnostic code is linked to the security critical code through the security safe critical code; and
triggering an error when the security agnostic code is not linked to the security critical code through the security safe critical code.

15. The method of claim 14, further comprising:
determining whether or not types in the code are at least as restrictive as a base type from which they inherit; and
providing an indication when types in the code are not at least as restrictive as a base type from which they inherit.

16. The method of claim 14, further comprising:
determining whether or not methods have changed accessibility from a base method from which they inherit; and
providing an indication when methods have changed accessibility from a base method from which they inherit.

17. The method of claim 14, further comprising:
determining if a base class has a default constructor, and if the base class has a default constructor, then determining if a derived class is at least as restrictive as the default constructor of the base class; and
providing an indication when a derived class is not at least as restrictive as the default constructor of the base class.

18. The method of claim 14, wherein the method is performed statically prior to a runtime of the code.

19. The method of claim 14, wherein the security agnostic code comprises an attribute identifying the security agnostic code as security agnostic code, the security critical code comprises an attribute identifying the security critical code as security critical code, and the security safe critical code comprises an attribute identifying the security safe critical code as security safe critical code.

20. The method of claim 14, wherein the security agnostic code is identified as security agnostic code using a keyword, the security critical code is identified as security critical code using a keyword, and the security safe critical is identified as security safe critical code using a keyword.

* * * * *